(12) United States Patent
Masumoto et al.

(10) Patent No.: US 9,898,211 B2
(45) Date of Patent: Feb. 20, 2018

(54) NONVOLATILE MEMORY CONTROL DEVICE, NONVOLATILE MEMORY CONTROL METHOD AND COMPUTER READABLE STORAGE MEDIUM

(71) Applicant: Konica Minolta, Inc., Chiyoda-ku, Tokyo (KP)

(72) Inventors: Kosuke Masumoto, Hachioji (JP); Takashi Hasebe, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 123 days.

(21) Appl. No.: 14/966,209

(22) Filed: Dec. 11, 2015

(65) Prior Publication Data

US 2016/0170663 A1    Jun. 16, 2016

(30) Foreign Application Priority Data

Dec. 15, 2014    (JP) .................................. 2014-252667

(51) Int. Cl.
G06F 3/06    (2006.01)

(52) U.S. Cl.
CPC .......... *G06F 3/0616* (2013.01); *G06F 3/0644* (2013.01); *G06F 3/0647* (2013.01); *G06F 3/0679* (2013.01); *G06F 3/0688* (2013.01)

(58) Field of Classification Search
CPC ..... G06F 2212/7211; G06F 2212/7205; G06F 2212/1036; G06F 3/0679; G06F 3/0688; G06F 3/0616; G06F 3/0644; G06F 3/0647; G06F 3/0652; G06F 12/0246; G11C 16/349; G11C 16/10; G11C 2211/5641
See application file for complete search history.

(56) References Cited

U.S. PATENT DOCUMENTS

| 2010/0017650 A1* | 1/2010 | Chin ...................... G06F 13/28 714/6.12 |
| 2010/0161880 A1* | 6/2010 | You ...................... G11C 16/349 711/103 |
| 2012/0191900 A1* | 7/2012 | Kunimatsu ........... G06F 3/0679 711/103 |
| 2012/0317345 A1* | 12/2012 | Pan ..................... G06F 12/0246 711/103 |
| 2013/0054878 A1* | 2/2013 | Lee ..................... G06F 12/0246 711/103 |

FOREIGN PATENT DOCUMENTS

JP    2008-97132 A    4/2008

* cited by examiner

*Primary Examiner* — Hashem Farrokh
(74) *Attorney, Agent, or Firm* — Squire Patton Boggs (US)

(57) ABSTRACT

A nonvolatile memory control device performs data reading/writing control on partitions of a rewritable nonvolatile semiconductor memory. The device includes an erase cycle counting unit, a read cycle counting unit, a data reading/writing unit and a control unit. The erase cycle counting unit counts the number of erase cycles in total per partition. The read cycle counting unit counts the number of read cycles that same data is read per partition. When the number of erase cycles of a first partition is equal to or larger than a predetermined number of erase cycles, and a second partition having a smaller number of erase cycles and a larger number of read cycles than the first partition is present, the control unit controls the data reading/writing unit to exchange data in the first partition and data in the second partition.

7 Claims, 3 Drawing Sheets

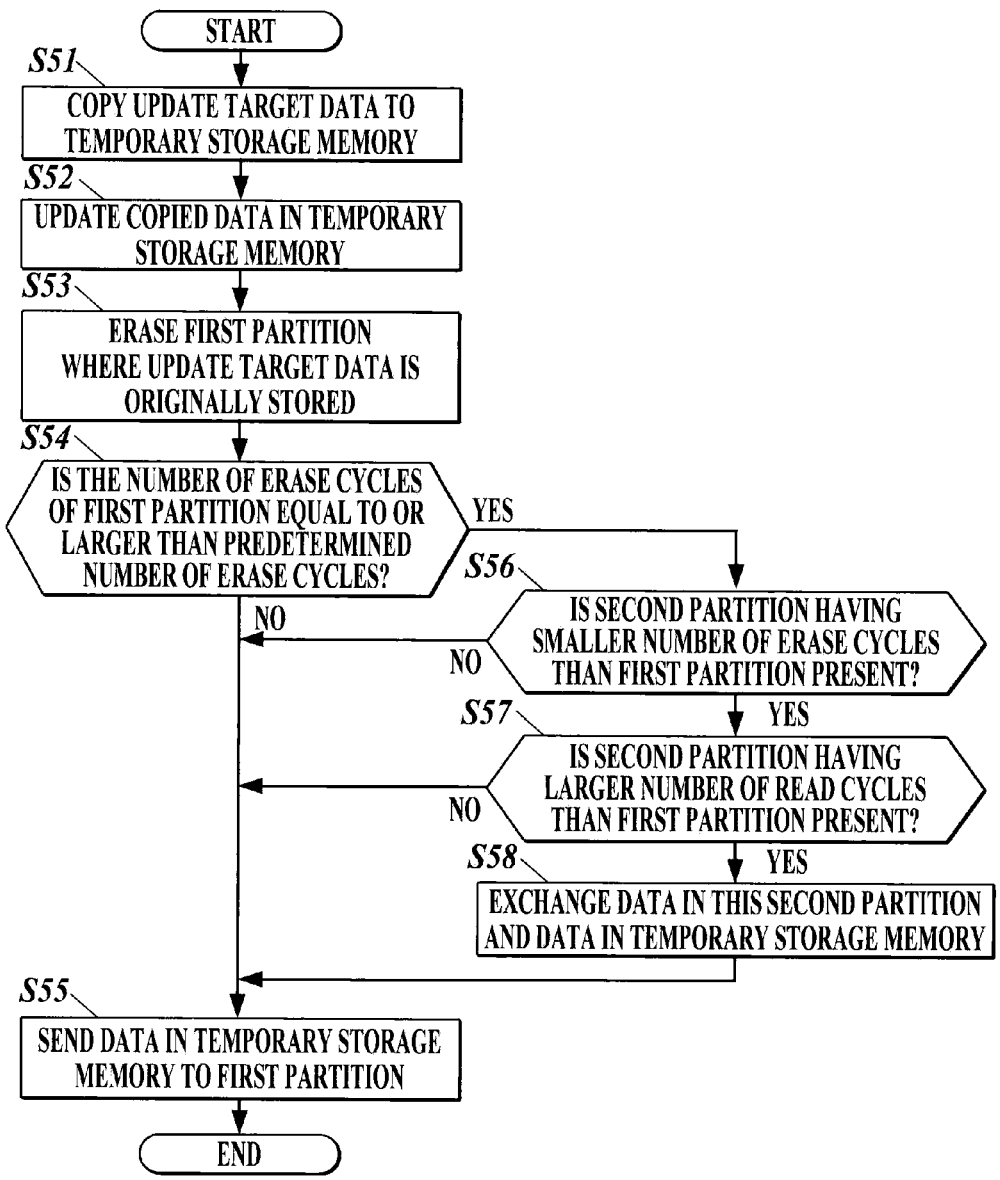

NONVOLATILE MEMORY CONTROL DEVICE, NONVOLATILE MEMORY CONTROL METHOD AND COMPUTER READABLE STORAGE MEDIUM

FIELD OF THE INVENTION

The present invention relates to a nonvolatile memory control device, a nonvolatile memory control method and a computer readable storage medium.

DESCRIPTION OF THE RELATED ART

Conventionally, in a rewritable nonvolatile semiconductor memory (hereinafter simply referred to as a "nonvolatile memory") such as an NAND flash memory, data is written by injecting electrons into a floating gate through a tunnel oxide film, and data is erased by drawing out electrons therefrom. Data is read/written in units of pages each constituted of a plurality of cells, whereas data is erased in units of blocks each constituted of a plurality of pages.

When data is rewritten in a cell, an electron, which passes through a tunnel oxide film, degrades the tunnel oxide film and thereby ends the service life of the cell. Thus, blocks have a limited number of erase cycles. In general, a nonvolatile semiconductor memory is often used in units of partitions each constituted of a plurality of blocks. Hence, partitions have a limited number of erase cycles in practice.

In order to prevent the service life of a nonvolatile memory as a whole from ending due to increase in the number of erase cycles of a particular partition of the nonvolatile memory, it is desired to level the numbers of erase cycles of partitions thereof.

To perform such leveling, there is described, for example, in Japanese Patent Application Publication No. 2008-097132 a nonvolatile memory device which, when the number of unused partitions is equal to or smaller than a threshold value, exchanges data in a partition having the largest number of rewrite cycles (the largest number of erase cycles) and data in a partition having the smallest number of rewrite cycles (the smallest number of erase cycles), thereby preventing concentration of rewriting in a particular partition and leveling the numbers of rewrite cycles (the numbers of erase cycles) of partitions.

However, data currently stored in a partition having the smallest number of rewrite cycles (the smallest number of erase cycles) does not mean that the data itself, which is currently stored in the partition having the smallest number of rewrite cycles, has the smallest number of rewrite cycles (the smallest number of erase cycles). In other words, the data stored in the partition having the smallest number of rewrite cycles (the smallest number of erase cycles) could be data having a large number of rewrite cycles (a large number of erase cycles).

Thus, leveling by the nonvolatile memory device described in Japanese Patent Application Publication No. 2008-097132 which pays attention only to the numbers of rewrite cycles (the numbers of erase cycles) of partitions may cause data having a large number of rewrite cycles (a large number of erase cycles) to be stored in a partition having the largest number of rewrite cycles (the largest number of erase cycles) again and, contrary to the purpose, may cause the service life of the nonvolatile memory to be shortened.

BRIEF SUMMARY OF THE INVENTION

Objects of the present invention include providing a nonvolatile memory control device, a nonvolatile memory control method and a computer readable storage medium each of which levels the numbers of erase cycles of partitions of a nonvolatile memory, thereby prolonging the service life of the nonvolatile memory.

In order to achieve at least one of the above objects, according to an aspect of the present invention, there is provided a nonvolatile memory control device which performs data reading/writing control on partitions of a rewritable nonvolatile semiconductor memory, including: an erase cycle counting unit which counts the number of erase cycles in total per partition; a read cycle counting unit which counts the number of read cycles that same data is read per partition; a data reading/writing unit which reads/writes data from/into the rewritable nonvolatile semiconductor memory; and a control unit which, when the number of erase cycles of a first partition among the partitions is equal to or larger than a predetermined number of erase cycles, and a second partition having a smaller number of erase cycles and a larger number of read cycles than the first partition is present in the partitions, controls the data reading/writing unit to exchange data in the first partition and data in the second partition.

Preferably, in the nonvolatile memory control device, when two or more of the second partition are present in the partitions, the control unit exchanges the data in the first partition and the data in the second partition having a largest number of read cycles among the second partitions.

Preferably, in the nonvolatile memory control device, the control unit has preset multiple values as the predetermined number of erase cycles, and when the number of erase cycles of the first partition is equal to or larger than a value which is currently set as the predetermined number of erase cycles, the control unit changes the currently-set value to a value which is larger than the number of erase cycles of the first partition.

Preferably, in the nonvolatile memory control device, the control unit has preset multiple values as the predetermined number of erase cycles, and when the number of erase cycles of each of all the partitions is equal to or larger than a value which is currently set as the predetermined number of erase cycles, the control unit changes the currently-set value to a value which is larger than the number of erase cycles of each of all the partitions.

Preferably, in the nonvolatile memory control device, when difference between a largest number of erase cycles which a third partition among the partitions has and a smallest number of erase cycles which a fourth partition among the partitions has is equal to or more than a predetermined value, and a fifth partition having a smaller number of erase cycles and a larger number of read cycles than the third partition, which has the largest number of erase cycles, is present in the partitions, the control unit exchanges data in the third partition and data in the fifth partition.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein:

FIG. 4 is an explanatory drawing showing an example of the number of erase cycles and the number of read cycles of each partition; and FIG. 5 is a flowchart to explain leveling operation of the numbers of erase cycles of partitions performed by the control unit.

DETAILED DESCRIPTION OF THE INVENTION

Embodiment

[1. Explanation of Configuration]

Hereinafter, a specific embodiment of the present invention is described with reference to the drawings. However, the scope of the present invention is not limited to the illustrated examples.

Figure 1:
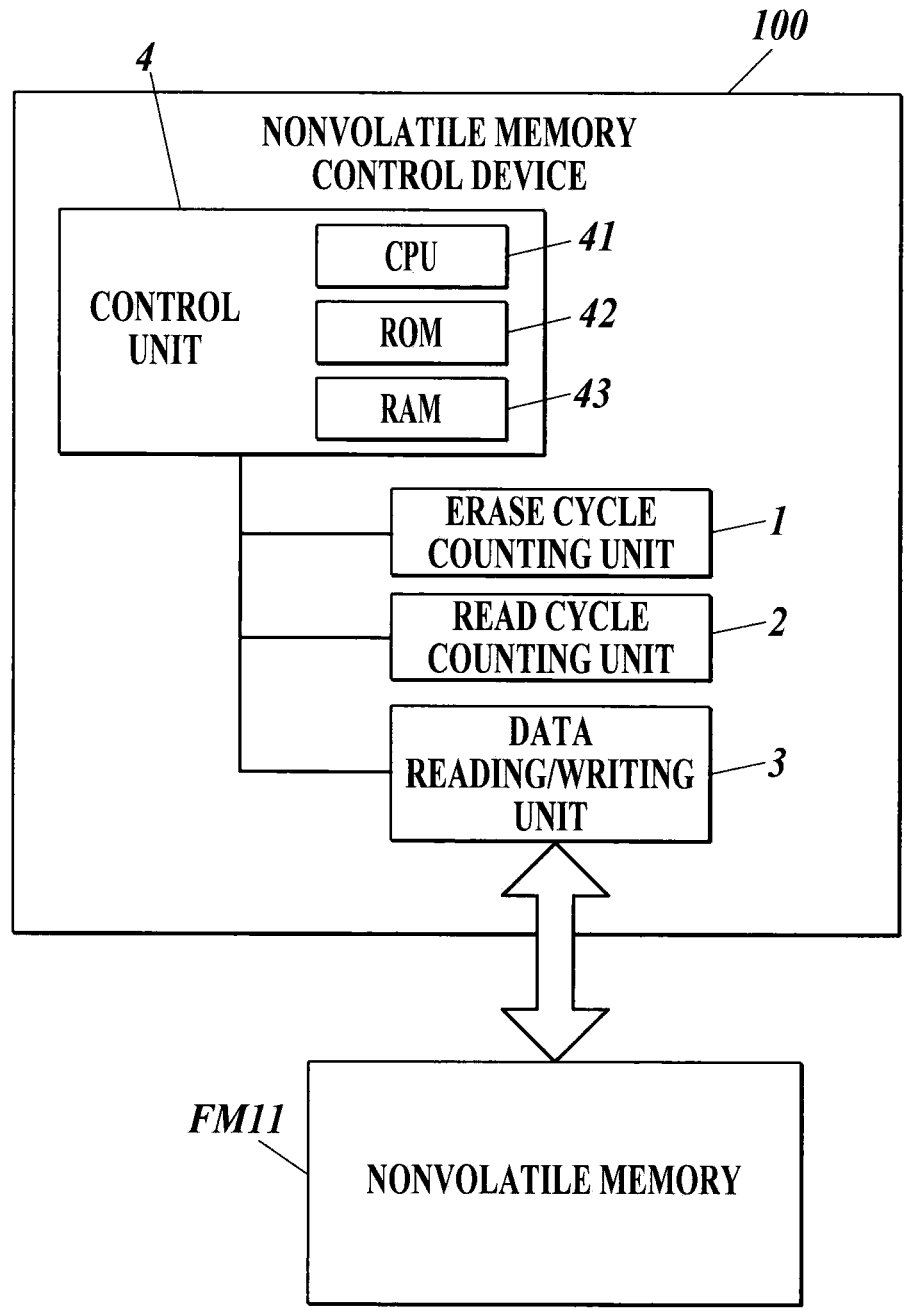
FIG. 1 is a block diagram showing the functional configuration of a nonvolatile memory control device according to an embodiment of the present invention.

FIG. 1 is a block diagram showing the functional configuration of a nonvolatile memory control device 100 according to an embodiment of the present invention.

As shown in FIG. 1, the nonvolatile memory control device 100 of the embodiment appropriately selects a partition to write data from among partitions of a nonvolatile memory FM11 so as to level the numbers of erase cycles of the partitions.

More specifically, the nonvolatile memory control device 100 of the embodiment includes an erase cycle counting unit 1, a read cycle counting unit 2, a data reading/writing unit 3 and a control unit 4.

The erase cycle counting unit 1 counts and holds the number of erase cycles in total per partition of the nonvolatile memory FM11. As the erase cycle counting unit 1, one which operates under the control of the control unit 4 may be used, or a circuit which operates independently from the control unit 4 may be used.

The read cycle counting unit 2 counts and holds the number of read cycles that the same data is read per partition of the nonvolatile memory FM11. The number of read cycles per partition is the number of times that the same data is read from a partition. Hence, when data in a partition is rewritten (or erased) and accordingly data sameness (unchangeableness) is lost, the number of read cycles of the partition is reset (set at 0)

As the read cycle counting unit 2, one which operates under the control of the control unit 4 may be used, or a circuit which operates independently from the control unit 4 may be used.

The data reading/writing unit 3 is connected with an input/output terminal or the like of the nonvolatile memory FM11 so as to read/write data from/into the nonvolatile memory FM11.

The control unit 4 includes, for example, a CPU (Central Processing Unit) 41, a ROM (Read Only Memory) 42 and a RAM (Random Access Memory) 43.

The CPU 41 reads a program for desired processing from a variety of processing programs stored in the ROM 42, opens the read program on the RAM 43 and performs concentrated control on operations of the erase cycle counting unit 1, the read cycle counting unit 2, the data reading/writing unit 3 and the like of the nonvolatile memory control device 100 by working together with the opened program so as to perform the desired processing. At the time, the CPU 41 refers to various data stored in a storage unit (s) (not shown) constituted of a flash memory, a hard disk or the like.

The control unit 4 may send/receive the various data to/from an external device (e.g. a personal computer) connected to a communication network such as a LAN (Local Area Network), a WAN (Wide Area Network) or the like through a communication unit (not shown) constituted of a LAN card or the like.

By executing a program(s), the control unit 4 functions as: an erase cycle counting unit which counts the number of erase cycles in total per partition; a read cycle counting unit which counts the number of read cycles that the same data is read per partition; and an exchange unit which, when the number of erase cycles of a partition (first partition) is equal to or larger than a predetermined number of erase cycles, and a partition (second partition) having a smaller number of erase cycles and a larger number of read cycles than the first partition is present, performs control to exchange data in the first partition and data in the second partition.

Figure 2:
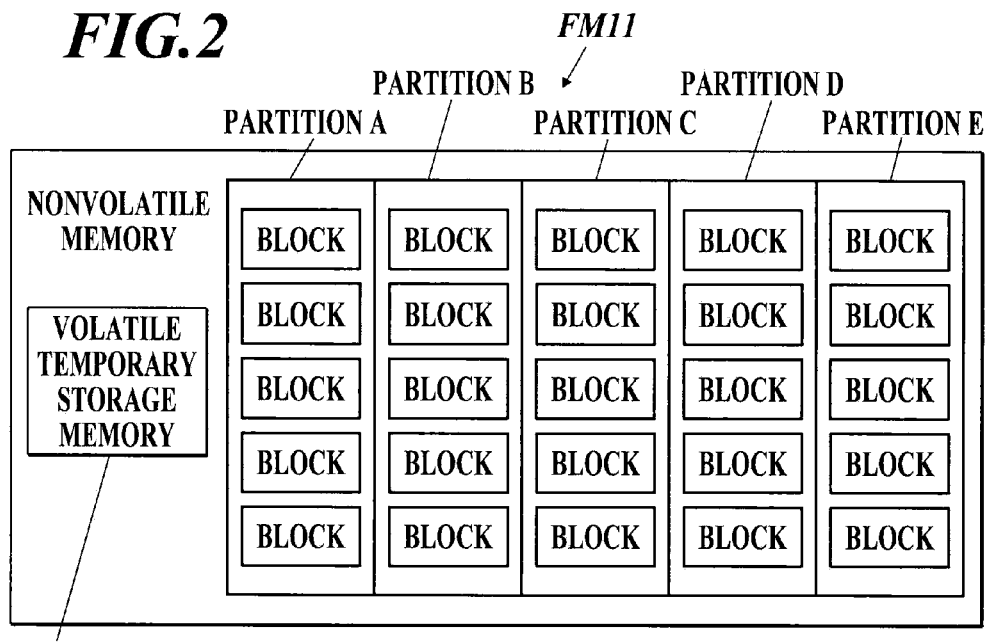
FIG. 2 is an explanatory drawing showing an example of the configuration of a nonvolatile memory.

FIG. 2 is an explanatory drawing showing an example of the specific configuration of the nonvolatile memory FM11. As shown in FIG. 2, the nonvolatile memory FM11 has partitions A, B, C, D and E each constituted of a plurality of blocks (blocks each constituted of a plurality of pages each constituted of a plurality of cells).

Further, as shown in FIG. 2, the nonvolatile memory FM11 has a volatile temporary storage memory TM21 (hereinafter referred to as a "temporary storage memory TM21") where data is temporarily stored to be rewritten or the like. For example, when data in a partition (first partition) is to be rewritten, the data is copied to the temporary storage memory TM21, the content of (i.e. the copied data in) the temporary storage memory TM21 is rewritten, the first partition, where the data is originally stored, is erased, and then the data in the temporary storage memory TM21 is sent back to the first partition.

[2. Explanation of Counting Operation]

Figure 3:
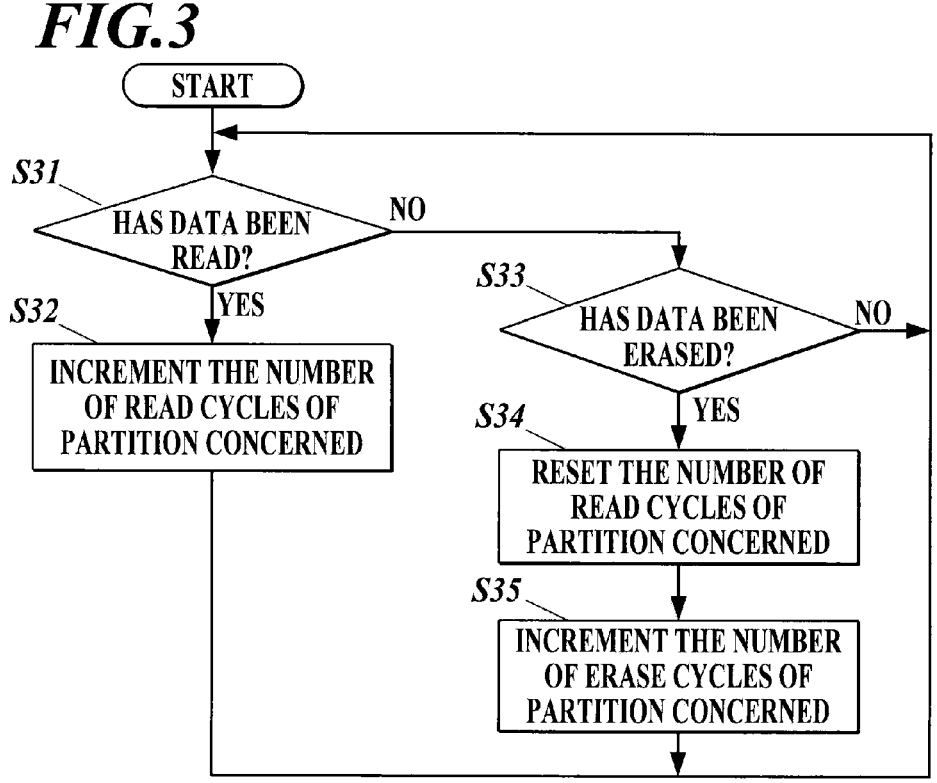
FIG. 3 is a flowchart to explain counting operation performed by a control unit.

Here, counting operation performed by the nonvolatile memory control device 100 is described with reference to FIG. 3 showing a flowchart.

As shown in the flowchart of FIG. 3, the control unit 4 determines whether or not data in the nonvolatile memory FM11 has been read (Step S31). When determining that data in the nonvolatile memory FM11 has been read (Step S31; YES), the control unit 4 increments (adds one to) the number of read cycles of a partition from which the data has been read (Step S32: a read cycle counting step) and returns to Step S31.

On the other hand, when determining that no data in the nonvolatile memory FM11 has been read (Step S31; NO), the control unit 4 determines whether or not data in the nonvolatile memory FM11 has been erased (or rewritten) (Step S33). When determining that no data in the nonvolatile memory FM11 has been erased (Step S33; NO), the control unit 4 returns to Step S31.

On the other hand, when determining that data in the nonvolatile memory FM11 has been erased (Step S33; YES), the control unit 4 resets the number of read cycles of a partition from which the data has been erased (Step S34: a read cycle counting step) and also increments (adds one to) the number of erase cycles of the partition from which the data has been erased (Step S35; an erase cycle counting step) and returns to Step S31.

As described above, according to the nonvolatile memory control device 100 of the embodiment, the erase cycle counting unit 1 counts and holds the number of erase cycles in total per partition, and the read cycle counting unit 2 counts and holds the number of read cycles that the same data is read per partition.

For example, as shown in FIG. 4, the number of erase cycles and the number of read cycles of each of the partitions A to E which constitute the nonvolatile memory FM11 are counted and held. As it is understood from FIG. 4, the number of erase cycles of each of the partitions A and D is 100 or larger, whereas the number of erase cycles of each of the partitions B, C and E is smaller than 100.

In particular, the number of read cycles of the partition B is 100 (the number of erase cycles thereof is 50). Hence, it is highly possible that the data stored in the partition B is data hardly rewritten (e.g. firmware, font data, etc.).

Incidentally, as storage units to store the number of erase cycles and the number of read cycles of each partition, the erase cycle counting unit 1 and the read cycle counting unit 2 may use specific regions of the RAM 43, include nonvolatile memories, be provided with storage units constituted of nonvolatile memories or use specific regions of the nonvolatile memory FM11.

In the above, the control unit 4 controls the erase cycle counting unit 1 and the read cycle counting unit 2 so that the erase cycle counting unit 1 and the read cycle counting unit 2 count the number of erase cycles and the number of read cycles, respectively. Needless to say, however, the erase cycle counting unit 1 and the read cycle counting unit 2 may be constituted of hardware and count the number of erase cycles and the number of read cycles, respectively, operating independently from the control of the control unit 4.

[3. Explanation of Leveling Operation]

Leveling operation of the numbers of erase cycles performed by the nonvolatile memory control device 100 is described with reference to FIG. 5 showing a flowchart.

As shown in FIG. 5, the control unit 4 copies data as an update target (i.e. update target data) to the temporary storage memory TM21 so as to update the date therein (Step S51), updates the data copied to and stored in the temporary storage memory TM21 (Step S52) and erases a partition (first partition) where the update target data is originally stored (Step S53).

Next, the control unit 4 refers to the number of erase cycles of the first partition and determines whether or not the number of erase cycles of the first partition is equal to or larger than a predetermined number of erase cycles (Step S54). When determining that the number of erase cycles of the first partition is not equal to or larger than the predetermined number of erase cycles (Step S54; NO), the control unit 4 sends the data in the temporary storage memory TM21 back to the first partition (Step S55).

On the other hand, when determining that the number of erase cycles of the first partition is equal to or larger than the predetermined number of erase cycles (Step S54; YES), the control unit 4 determines whether or not at least one partition (second partition) having a smaller number of erase cycles than the first partition is present (Step S56). When determining that no partition (second partition) having a smaller number of erase cycles than the first partition is present (Step S56: NO), the control unit 4 sends the data in the temporary storage memory TM21 back to the first partition (Step S55).

On the other hand, when determining that at least one partition (second partition) having a smaller number of erase cycles than the first partition is present (Step S56: YES), the control unit 4 determines whether or not a second partition having a larger number of read cycles than the first partition is present in the second partition(s) (Step S57). When determining that no second partition having a larger number of read cycles than the first partition is present in the second partition(s) (Step S57: NO), the control unit 4 sends the data in the temporary storage memory TM21 back to the first partition (Step S55).

On the other hand, when determining that a second partition having a larger number of read cycles than the first partition is present in the second partition(s) (Step S57: YES), the control unit 4 exchanges the data in the second partition satisfying the above conditions and the data in the temporary storage memory TM21 (Step S58: an exchange step) and then sends the data in the temporary storage memory TM21 to the first partition (Step S55).

That is, through Steps S58 and S55, the update target data (updated data) is written in the partition satisfying the conditions (the second partition having a smaller number of erase cycles and a larger number of read cycles than the first partition, where the update target data is originally stored), and the data in the partition satisfying the conditions is written in the partition where the update target data is originally stored (the first partition having the number of erase cycles exceeding the predetermined number of erase cycles). In other words, concentration of writing into the partition where the update target data is originally stored (the first partition having the number of erase cycles exceeding the predetermined number of erase cycles) can be prevented, and therefore the numbers of erase cycles of the partitions can be leveled.

Further, it is highly possible that the data stored in such a partition (the second partition having a smaller number of erase cycles and a larger number of read cycles than the first partition, where the update target data is originally stored) is data hardly rewritten (e.g. firmware, font data, etc.). Hence, by storing such data in the first partition having the number of erase cycles exceeding the predetermined number of erase cycles, the numbers of erase cycles of the partitions are leveled, and accordingly the nonvolatile memory FM11 can have a long service life.

As described above, the nonvolatile memory control device 100 of the embodiment includes: the erase cycle counting unit 1 which counts the number of erase cycles in total per partition; the read cycle counting unit 2 which counts the number of read cycles that the same data is read per partition; the data reading/writing unit 3 which reads/writes data from/into the nonvolatile memory FM11; and the control unit 4 which, when the number of erase cycles of a first partition among the partitions is equal to or larger than a predetermined number of erase cycles, and a second partition having a smaller number of erase cycles and a larger number of read cycles than the first partition is present in the partitions, controls the data reading/writing unit 3 to exchange data in the first partition and data in the second partition. Consequently, there can be provided a nonvolatile memory control device which levels the numbers of erase cycles of partitions of a nonvolatile memory, thereby prolonging the service life of the nonvolatile memory.

(First Modification)

[4. Presence of Plurality of Partitions Satisfying Conditions]

In the above embodiment, when the number of erase cycles of a partition (first partition) is equal to or larger than a predetermined number of erase cycles, and a partition (second partition) having a smaller number of erase cycles and a larger number of read cycles than the first partition is present, the control unit 4 of the nonvolatile memory control device 100 exchanges data in the first partition and data in the second partition. However, when a plurality of second partitions satisfying these conditions is present, the control unit 4 may exchange data in the first partition and data in a second partition having the largest number of read cycles among the second partitions.

(Second Modification)

[5-1. Change in Predetermined Number of Erase Cycles]

In the above embodiment, the control unit 4 of the nonvolatile memory control device 100 takes one predetermined value as a predetermined number of erase cycles, which is compared with the number of erase cycles of each partition. Alternatively, multiple values may be set as a predetermined number of erase cycles, and the control unit 4 may change a value to another according to a condition(s).

For example, when the number of erase cycles of the first partition, where the update target data is originally stored, is equal to or larger than a value which is currently set as a predetermined number of erase cycles, the control unit 4 may change the currently-set value to a value which is larger than the number of erase cycles of the first partition.

In this case, the predetermined number of erase cycles goes up gradually, so that the numbers of erase cycles of the partitions can be finely leveled, and accordingly the nonvolatile memory FM11 can have a long service life.

(Third Modification)

[5-2. Change in Predetermined Number of Erase Cycles]

In the above embodiment, the control unit 4 of the nonvolatile memory control device 100 takes one predetermined value as a predetermined number of erase cycles, which is compared with the number of erase cycles of each partition. Alternatively, multiple values may be set as a predetermine number of erase cycles, and the control unit 4 may change a value to another according to a condition(s).

For example, when the number of erase cycles of each of all the partitions is equal to or larger than a value which is currently set as a predetermined number of erase cycles, the control unit 4 may change the currently-set value to a value which is larger than the number of erase cycles of each of all the partitions.

In this case, at the time when the number of erase cycles of each of all the partitions exceeds the predetermined number of erase cycles, the predetermined number of erase cycles goes up, so that the frequency of changing values of the predetermined number of erase cycles can be reduced, and also the nonvolatile memory FM11 can have a long service life.

(Fourth Modification)

[6. Difference between Largest Number of Erase Cycles and Smallest Number of Erase Cycles]

In the above embodiment, when the number of erase cycles of a partition (first partition) is equal to or larger than a predetermined number of erase cycles, the control unit 4 of the nonvolatile memory control device 100 exchanges data in this partition (first partition) and data in another partition (second partition). The control unit 4 may perform data exchange when difference between the largest number of erase cycles and the smallest number of erase cycles is equal to or larger than a predetermined value.

For example, when difference between the largest number of erase cycles which a third partition has and the smallest number of erase cycles which a fourth partition has is equal to or larger than a predetermined value, and a fifth partition having a smaller number of erase cycles and a larger number of read cycles than the third partition, which has the largest number of erase cycles, is present, the control unit 4 may exchange data in third partition and data in the fifth partition.

In this case, attention is paid not only to the number of erase cycles of a particular partition but also to the difference between the largest number of erase cycles of a partition and the smallest number of erase cycles of a partition, and accordingly the difference between the largest number of erase cycles of a partition and the smallest number of erase cycles of a partition can be prevented from being too large.

In the second and third modifications, multiple values are preset as a predetermined number of erase cycles. These values are not limited to values in which the amount of increase is fixed. Hence, the values may be values in which the amount of increase becomes smaller as a limited number of erase cycles, which is the end of the service life, is approaching.

In this case, the number of erase cycles can be made as close as the limited number of erase cycles, which is the end of the service life, and accordingly the nonvolatile memory FM11 can have a long service life.

Application of the above-described nonvolatile memory control device to an image forming apparatus provided with a nonvolatile memory and having frequently-rewritten data (e.g. image data, etc.) and hardly-rewritten data (e.g. firmware, font data, etc.) coexisting therein can prevent concentration of writing of the frequently-rewritten data, such as image data, into a partition having the number of erase cycles exceeding a predetermined number of erase cycles. Consequently, the numbers of erase cycles of partitions of a nonvolatile memory can be leveled, and accordingly the nonvolatile memory can have a long service life.

The present invention is not limited to the above embodiment and modifications and can be appropriately modified within the scope not departing from the spirit of the present invention.

This application is based upon and claims the benefit of priority under 35 USC 119 of Japanese Patent Application No. 2014-252667 filed on Dec. 15, 2014, the entire disclosure of which, including the specification, claims, drawings and abstract, is incorporated herein by reference in its entirety.

What is claimed is:

1. A nonvolatile memory control device which performs data reading/writing control on partitions of a rewritable nonvolatile semiconductor memory, comprising:
    an erase cycle counting unit which counts the number of erase cycles in total per partition;
    a read cycle counting unit which counts the number of read cycles that same data is read per partition;
    a data reading/writing unit which reads/writes data from/ into the rewritable nonvolatile semiconductor memory; and
    a control unit which, on condition that the number of erase cycles of a first partition among the partitions is equal to or larger than a predetermined number of erase cycles, and a second partition having a smaller number of erase cycles and a larger number of read cycles than the first partition is present in the partitions, controls the data reading/writing unit to exchange data in the first partition and data in the second partition.

2. The nonvolatile memory control device according to claim 1, wherein when two or more of the second partition are present in the partitions, the control unit exchanges the data in the first partition and the data in the second partition having a largest number of read cycles among the second partitions.

3. The nonvolatile memory control device according to claim 1, wherein
    the control unit has preset multiple values as the predetermined number of erase cycles, and
    when the number of erase cycles of the first partition is equal to or larger than a value which is currently set as the predetermined number of erase cycles, the control unit changes the currently-set value to a value which is larger than the number of erase cycles of the first partition.

4. The nonvolatile memory control device according to claim 1, wherein the control unit has preset multiple values as the predetermined number of erase cycles, and when the number of erase cycles of each of all the partitions is equal to or larger than a value which is currently set as the predetermined number of erase cycles, the control unit changes the currently-set value to a value which is larger than the number of erase cycles of each of all the partitions.

5. The nonvolatile memory control device according to claim 1, wherein when difference between a largest number of erase cycles which a third partition among the partitions has and a smallest number of erase cycles which a fourth partition among the partitions has is equal to or more than a predetermined value, and a fifth partition having a smaller number of erase cycles and a larger number of read cycles than the third partition, which has the largest number of erase cycles, is present in the partitions, the control unit exchanges data in the third partition and data in the fifth partition.

6. A nonvolatile memory control method for performing data reading/writing control on partitions of a rewritable nonvolatile semiconductor memory, comprising:

counting the number of erase cycles in total per partition;

counting the number of read cycles that same data is read per partition; and performing, on condition that the number of erase cycles of a first partition among the partitions is equal to or larger than a predetermined number of erase cycles, and a second partition having a smaller number of erase cycles and a larger number of read cycles than the first partition is present in the partitions, control to exchange data in the first partition and data in the second partition.

7. A computer readable storage medium storing therein a program for performing data reading/writing control on partitions of a rewritable nonvolatile semiconductor memory to make a computer function as:

an erase cycle counting unit which counts the number of erase cycles in total per partition;

a read cycle counting unit which counts the number of read cycles that same data is read per partition; and an exchange unit which, on condition that the number of erase cycles of a first partition among the partitions is equal to or larger than a predetermined number of erase cycles, and a second partition having a smaller number of erase cycles and a larger number of read cycles than the first partition is present in the partitions, performs control to exchange data in the first partition and data in the second partition.

* * * * *